M. Morgan.
Horse Rake.
Nº 21268      Patented Aug. 24, 1858.
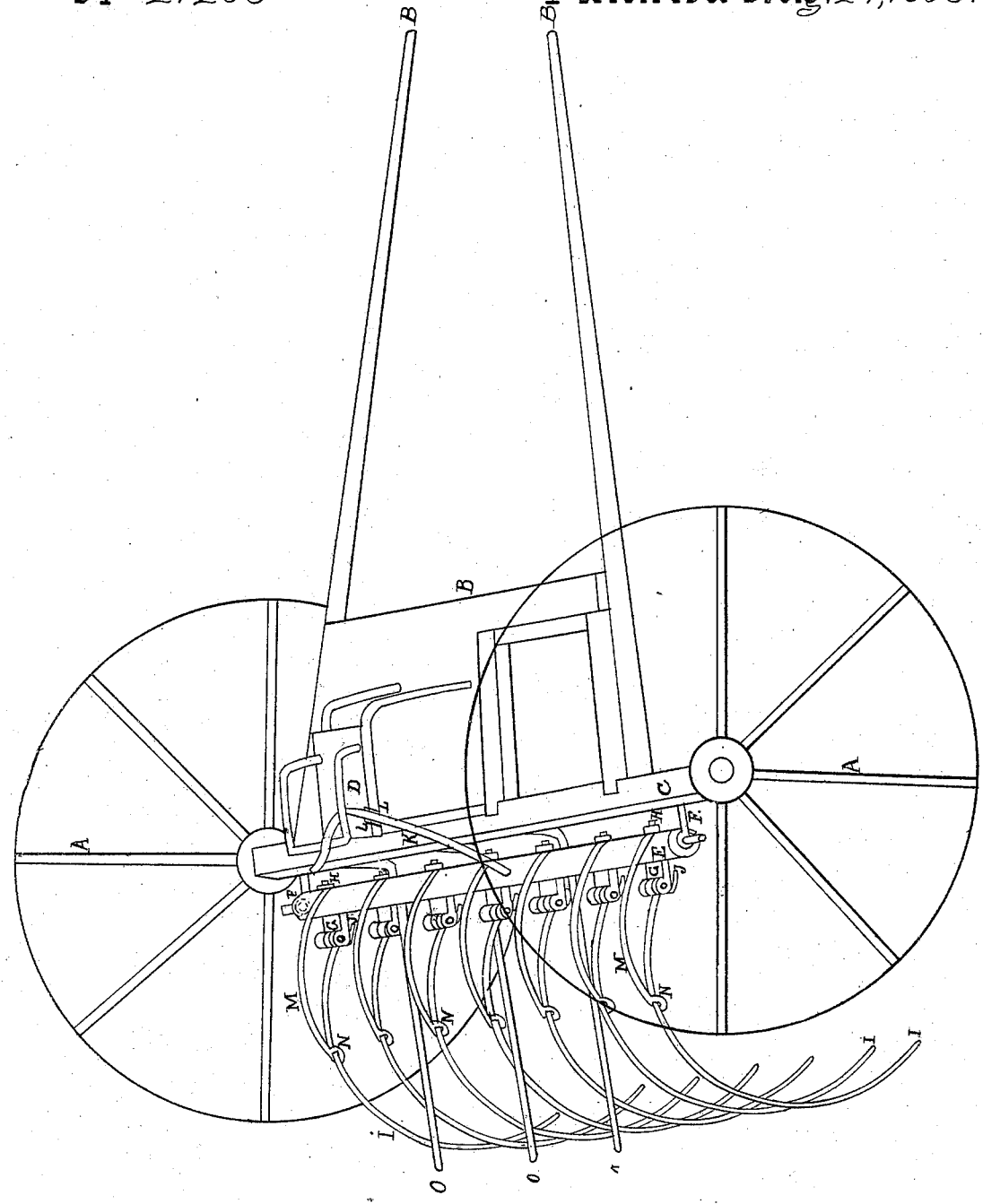
Inventor.
Mirick Morgan

UNITED STATES PATENT OFFICE.

MIRICK MORGAN, OF LANCASTER, PENNSYLVANIA.

IMPROVEMENT IN HORSE-RAKES.

Specification forming part of Letters Patent No. 21,268, dated August 24, 1858.

*To all whom it may concern:*

Be it known that I, MIRICK MORGAN, of Lancaster city, county of Lancaster, and State of Pennsylvania, have invented new and useful Improvements on the Horse-Rake for Raking Grain and Hay; and I do hereby declare that the following is a full, clear, and exact description thereof, reference being had to the accompanying drawing, making a part of this specification.

The nature of my invention consists in an arrangement of devices which will be hereinafter described.

To enable others skilled in the art to make and use my invention, I will proceed to describe its construction and operation.

A is the carriage-wheels; B, the frame and shaft, resting upon the carriage-axle C; D, the driver's seat, fastened on top of frame B.

E is a horizontal wooden roller, suspended to and parallel with the axle C, and made to revolve half round in iron eyes F projecting from the axle C.

G are cast-iron hinges or joints, fastened to the roller E by screw-bolts and nuts H.

I are the teeth which form the rake, and are made of rod-iron and curved inwardly, the upper end, J, of each tooth being bent half around the center of the hinge G, and then bent backward underneath the hinge G, so as to stiffen the tooth and prevent it from falling downward when the teeth are raised by the operation of the lever K. This upright lever K is of rod-iron, and fastened to the center of the roller E, and while the rake is in motion it rests in a groove, L, cut in the side of the driver's seat D.

M are steel springs, the one end of which is fastened to the back end of hinge G by the nut H, and are attached at their other end to the teeth I by an eye, N, surrounding the tooth I. These springs M are located above each tooth I, and are for the purpose of keeping the teeth I down to their place.

The advantage of the upright lever K is to enable the driver to operate the lever K by catching hold of it with his right hand, and by pressing it forward the teeth are more easily raised simultaneously, and the rake is cleared by the cleaners O. The cleaners O are made of rod-iron and fastened to and project from the axle C.

What I claim as my invention, and desire to secure by Letters Patent, is—

The arrangement of the axle C and clearers O with teeth I, having curved ends J, hinges G, and roller E, the whole bing constructed for joint operation, as and for the purpose set forth.

MIRICK MORGAN.

Witnesses:
J. FRANKLIN REIGART,
JOHN SHAEFER.